US011350580B2

(12) United States Patent
Eichenauer et al.

(10) Patent No.: US 11,350,580 B2
(45) Date of Patent: Jun. 7, 2022

(54) GROUND MATS FOR WATER DISTRIBUTION

(71) Applicant: Thomas Eichenauer, Vienna (AT)

(72) Inventors: Thomas Eichenauer, Vienna (AT); Dorothea Sulzbacher, Vienna (AT)

(73) Assignee: Thomas Eichenauer, Vienna (AT)

( * ) Notice: Subject to any disclaimer, the term of this patent is extended or adjusted under 35 U.S.C. 154(b) by 160 days.

(21) Appl. No.: 16/318,642

(22) PCT Filed: Jun. 13, 2017

(86) PCT No.: PCT/AT2017/050013
§ 371 (c)(1),
(2) Date: Jan. 17, 2019

(87) PCT Pub. No.: WO2018/014055
PCT Pub. Date: Jan. 25, 2018

(65) Prior Publication Data
US 2019/0239454 A1   Aug. 8, 2019

(30) Foreign Application Priority Data
Jul. 21, 2016  (AT) .............................. A 50668/2016

(51) Int. Cl.
*A01G 25/02* (2006.01)
*A01G 25/06* (2006.01)
*A01G 13/02* (2006.01)

(52) U.S. Cl.
CPC ......... *A01G 25/02* (2013.01); *A01G 13/0268* (2013.01); *A01G 25/06* (2013.01)

(58) Field of Classification Search
CPC ..... A01G 25/02; A01G 13/0268; A01G 25/06
See application file for complete search history.

(56) References Cited

U.S. PATENT DOCUMENTS 5,938,372 A * 8/1999 Lichfield ................ A01G 25/06
405/36
6,630,414 B1 * 10/2003 Matsumoto ............ D04B 21/20
442/1
(Continued)

FOREIGN PATENT DOCUMENTS

DE  10 2011 083742 A1   3/2013
JP  S57 1547 U           1/1982
(Continued)

OTHER PUBLICATIONS

Kneidinger, Von Barbara,. New eco-textile Company scores with fleece solution for irrigation systems, Kronen Zeitung. [serialonline], [retrieved on Oct. 19, 2020], Retrieved from the Internet <URL: https://lite-soil.com/en/presse/> (Year: 2016).*

*Primary Examiner* — Monica L Barlow
*Assistant Examiner* — Brittany A Lowery
(74) *Attorney, Agent, or Firm* — Polsinelli PC (57) ABSTRACT

The invention relates to a device for conducting water in a ground surface, comprising a nonwoven layer introduced into the ground (6), which nonwoven layer has at least one conduit strand (4) provided with passage openings (5) for conducting water. In order to create advantageous construction conditions, it is proposed that the nonwoven layer forms a grid (1) made of intersecting arrays of grid strands and comprises a nonwoven web (3) extending along the conduit strand (4), and that at least one array of grid strands formed of nonwoven strips (2) adjoins the nonwoven web (3).

9 Claims, 7 Drawing Sheets

(56) References Cited

U.S. PATENT DOCUMENTS

2008/0072480 A1* 3/2008 McGrady ........... A01G 13/0268
47/21.1
2013/0075490 A1* 3/2013 Roess ................... A01G 25/06
239/145

FOREIGN PATENT DOCUMENTS

| JP | 2000 265345 A | 9/2000 |
| JP | 2005 237261 A | 9/2005 |
| WO | 91/03155 A1 | 3/1991 |
| WO | 2015/176100 A1 | 11/2015 |

\* cited by examiner

GROUND MATS FOR WATER DISTRIBUTION

FIELD OF THE INVENTION

The invention relates to a device for conducting water in a ground surface with a nonwoven layer introduced into the ground, which has at least one water-conducting conduit strand provided with passage openings.

DESCRIPTION OF THE PRIOR ART

In order to be able to irrigate a ground surface without having to apply water from above, it is known (WO 2016/046264 A1) that an irrigation mat running essentially parallel to the ground surface is provided in the soil, which mat is made up of two needle-punched nonwoven layers, between which irrigation pipes with passage openings for the water outlet are arranged, so that the water escaping from the irrigation pipes is distributed over the surface of such irrigation mats by capillary action. These irrigation mats act as a barrier, especially for worms, and also hinder the deep growth of plant roots. In this context, it should also be noted that the water collects on the underside of the irrigation mat due to gravity and is therefore only available to a limited extent for plants growing from above into the depths. Since such irrigation mats are preferably laid at the usual root depth of adult plants, young plants whose roots do not yet reach sufficiently deep into the soil during the growth phase may receive too little water despite the irrigation mat.

To improve water distribution in a soil layer, it is also known (WO 2010/022421 A1) to insert nonwoven strips into the soil layer, which can absorb and distribute water due to their capillary effect. These nonwoven strips can form grids for easier insertion into a soil layer, which can easily be grown through due to the selected width of the grid openings. However, such nonwoven grids are not used to irrigate ground surfaces, but to distribute the water already absorbed by the soil over a corresponding ground surface, because the nonwoven strips can absorb water from the ground areas of high moisture and, due to the capillary effect, conduct it to areas with lower ground moisture.

SUMMARY OF THE INVENTION

The invention is therefore based on the object of providing a device which can be used in particular to irrigate an area of soil intended for planting in such a way that the plants can be sufficiently supplied with water without hindering plant growth. In addition, the prerequisites are to be created for using such a device to discharge excess water from a ground area.

Based on a device of the type described initially, the invention solves the object in that the nonwoven layer forms a grid made of intersecting arrays of grid strands and comprises a nonwoven web extending along the conduit strand, and that at least one array of grid strands formed from nonwoven strips adjoins the nonwoven web.

By providing a nonwoven web along the conduit strand, the water escaping from the conduit strand through the passage openings can be absorbed by the nonwoven web in the event of irrigation, which thus serves as a distributor for the water taken up to the nonwoven strips of the grid connected to the nonwoven web, so that corresponding quantities of water can be fed into the grid in a simple manner. The capillary effect distributes the water from the nonwoven web to the grid over the grid surface and releases it to the soil depending on the respective soil moisture.

The grid consisting of at least one array of nonwoven strips offers the advantage of allowing plants to be able to grow through in comparison to an irrigation mat according to the state of the art and therefore permits laying independent of the root depth of adult plants at a soil depth corresponding to the root depth in the growing phase. The plants can therefore be sufficiently supplied with water and, if necessary, with nutrients dissolved in the water both during the growth phase and later. In addition, with a comparable nonwoven volume, the nonwoven strips of a grid are considerably thicker than the nonwoven layers of an irrigation mat and therefore provide a larger volume for water absorption and transfer than known irrigation mats even in the case of blockages of near-surface pores with fine particles of the soil. In addition, the grid of the nonwoven layer supports the cohesion of the soil and improves the anchoring of the roots in the soil.

In the event of dewatering, the nonwoven web acts as a collector for the excess water conducted via the nonwoven strips of the grid to the nonwoven web, which can then flow from the nonwoven web out of the grid area through the passage openings of the conduit strand in the latter. To support the drainage effect, the nonwoven web connected to the conduit strand can extend in an area of greater laying depth determined by the grid laying, i.e. in a wave valley of the grid, just as the nonwoven web can be provided in the area of a wave crest of the grid in order to better feed water into the grid, in order to be able to additionally use gravity for the water conduit.

In order to ensure that water can be transferred well from the conduit strand into the nonwoven web or from the nonwoven web into the conduit strand, the nonwoven web can encase the conduit strand. However, this is not mandatory. For the same purpose, the conduit strand can also be arranged between the nonwoven web and a covering web connected to the nonwoven web, which does not necessarily have to be designed as a nonwoven.

The grid itself can be made up of cross-laid arrays of grid strings, of which at least one array consists of nonwoven strips which ensure the capillary water conduit. In order to create advantageous conditions with respect to grid production, the nonwoven layer may comprise an at least single-layer nonwoven, which is provided with parallel rows of separating cuts arranged one behind the other with mutual spacing and offset in rows with respect to one another, and is pulled apart transversely to the rows of separating cuts with respect to the grid. This grid can be connected to a continuous nonwoven web running along the conduit strand in order to ensure an advantageous water transfer between the nonwoven web and the nonwoven strips of the grid. Simpler construction conditions result, however, if the nonwoven itself forms the continuous nonwoven web and is pulled apart on both sides of this nonwoven web to form the grid with the aid of the separating cut rows parallel to the nonwoven web.

The nonwoven for grid production may be composed of a nonwoven layer and at least one further layer bonded to the nonwoven layer in order to meet special requirements, wherein the second layer concerns a nonwoven layer, but can also be a film or fabric and the like. If each of these two layers of the nonwoven forms a web layer, the conduit strand can run advantageously between these web layers. The grid structure of at least two layers also allows the incorporation of additives and/or reinforcing inserts between the interconnected layers.

BRIEF DESCRIPTION OF THE INVENTION

The subject matter of the invention is shown by way of example in the drawings, wherein.

BRIEF DESCRIPTION OF THE PREFERRED EMBODIMENTS

Figure 1:
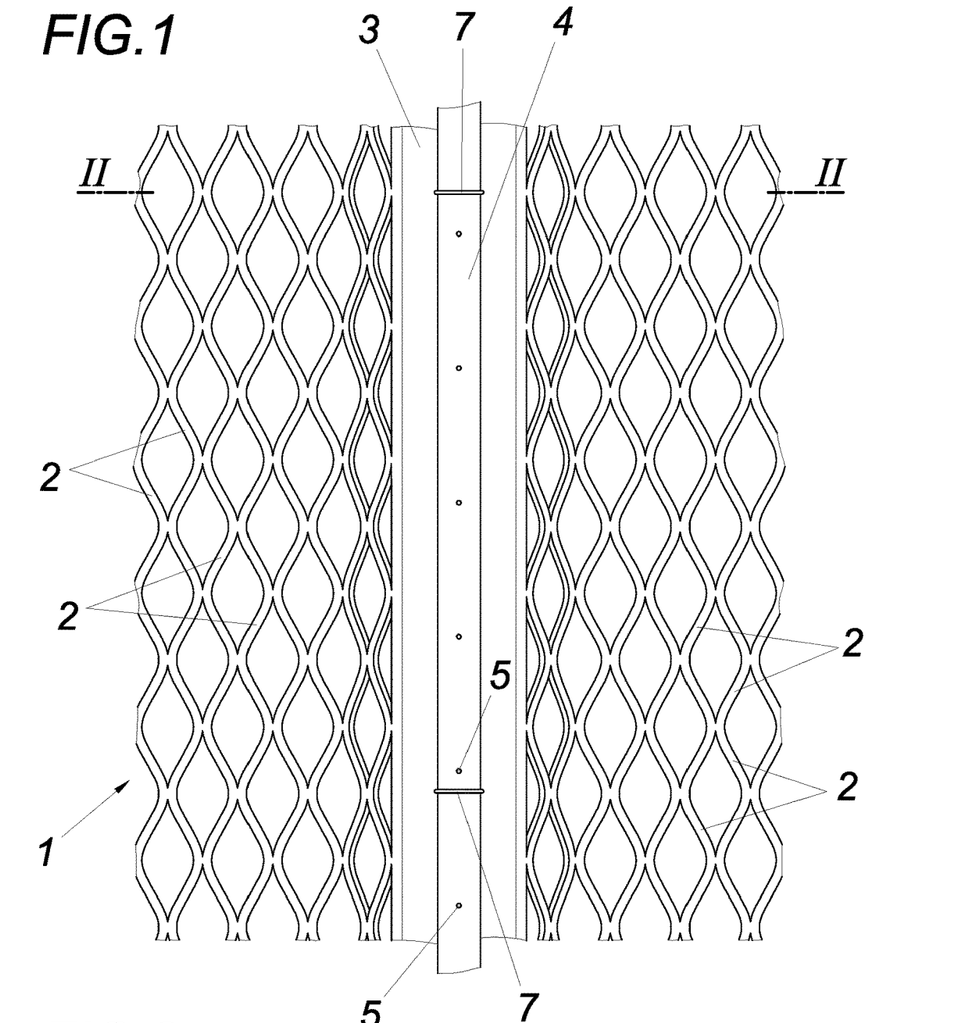
FIG. 1 shows a device in accordance with the invention for the irrigation of a ground area in sections in the region of a conduit strand for water supply in a plan view.
Figure 2:
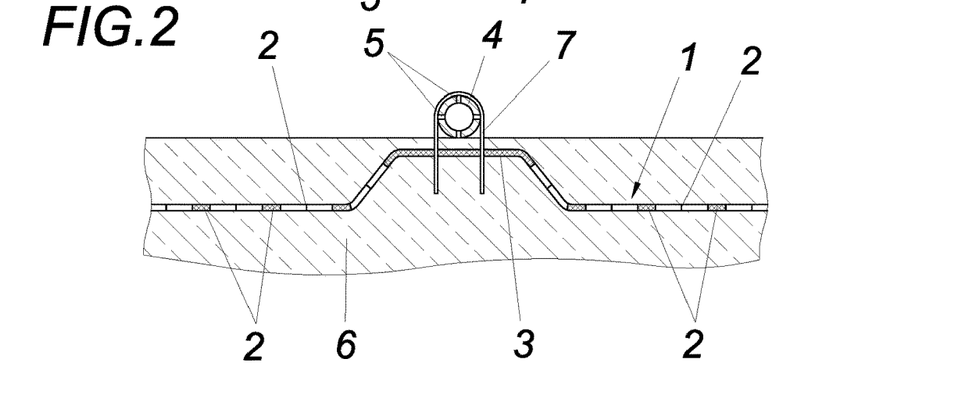
FIG. 2 shows this device in a section according to line II-II of FIG. 1.

The device for irrigating a bottom surface according to FIGS. 1 and 2 comprises a nonwoven layer in the form of a grid 1 of two intersecting arrays of nonwoven strips 2 and a continuous nonwoven web 3 along a conduit strand 4 fed with water exiting through passage openings 5 from the conduit strand 4 onto the nonwoven web 3. As can be seen in particular from FIG. 2, the grid 1 is embedded essentially parallel to the surface in the soil 6 to be irrigated and forms a wave only in the area of the conduit strand 4 laid on the surface of the soil 6 with the aid of fastening brackets 7, whose wave crest near the surface is formed by the nonwoven web 3. The water seeping through from conduit strand 4 to the nonwoven web 3 is absorbed by the nonwoven web 3 and, due to the capillary effect, is transferred by gravity to the nonwoven strips 2 of the grid 1 in order to be distributed through these nonwoven strips 2 over the ground surface to be irrigated.

Grid 1 is made of a nonwoven fabric provided with parallel rows of separating cuts which are arranged spaced-apart in succession and mutually offset in rows, and is pulled apart transversely to the rows of separating cuts towards grid 1. The distance between the rows corresponds to the width of the nonwoven strips 2. The length of the grid openings in the direction of the conduit strand 4 is determined by the length of the separating cuts and transversely thereto by the stretching of the grid 1. According to FIGS. 1 and 2, the nonwoven web 3 is part of the nonwoven grid, which has separating cut rows parallel to the web on both sides of the nonwoven web 3 and is stretched transversely to these rows of separating cuts to the grid 1.

Figure 3:
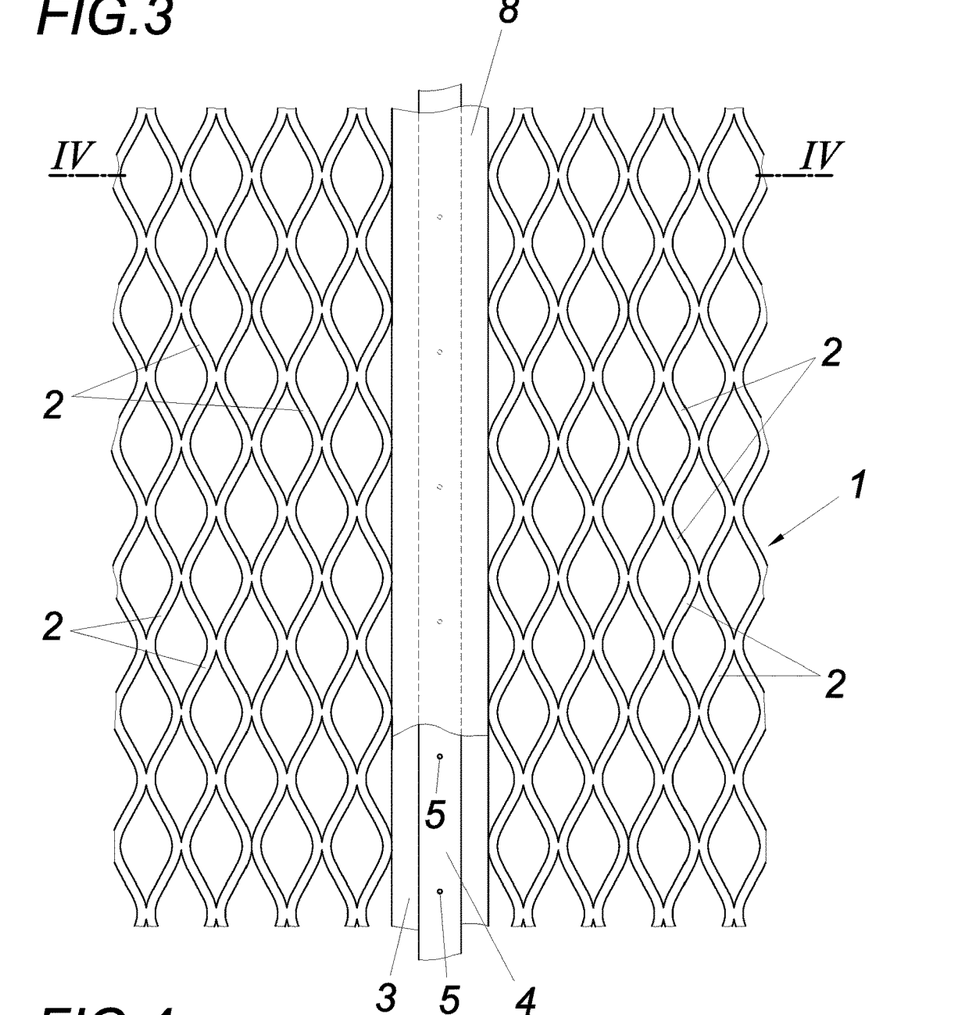
FIG. 3 shows an embodiment variant of a device according to the invention in a plan view.
Figure 4:
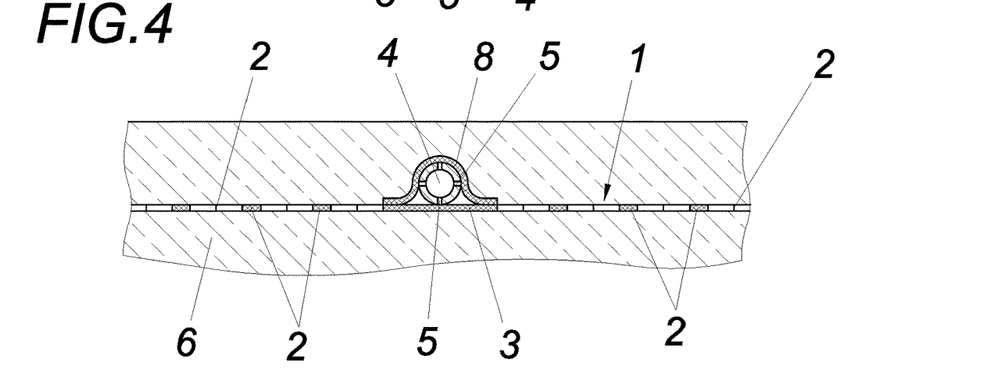
FIG. 4 shows a section according to the line IV-IV of FIG. 3.

As illustrated in the embodiment according to FIGS. 3 and 4, the conduit strand 4 can be integrated into the nonwoven layer in that the conduit strand 4 extends between the nonwoven web 3 and a cover web 8 preferably consisting of a nonwoven and connected to the nonwoven web 3. The water escaping from the conduit strand 4 through the passage openings 5 thus reaches the nonwoven web 3 partly directly and partly via the cover web 8, in order to be transferred from the nonwoven web 3 back into the grid 1, which in this case can essentially be laid parallel to the surface. The guidance of the conduit strand 4 between the nonwoven web 3 and the cover web 8 also protects the conduit strand 4 against blockage of the passage openings 5 by fine-grained earth material or by ingrowing roots. However, instead of using a cover web 8, the nonwoven sheet 3 could also completely surround the conduit strand 4 in a loop.

Figure 5:
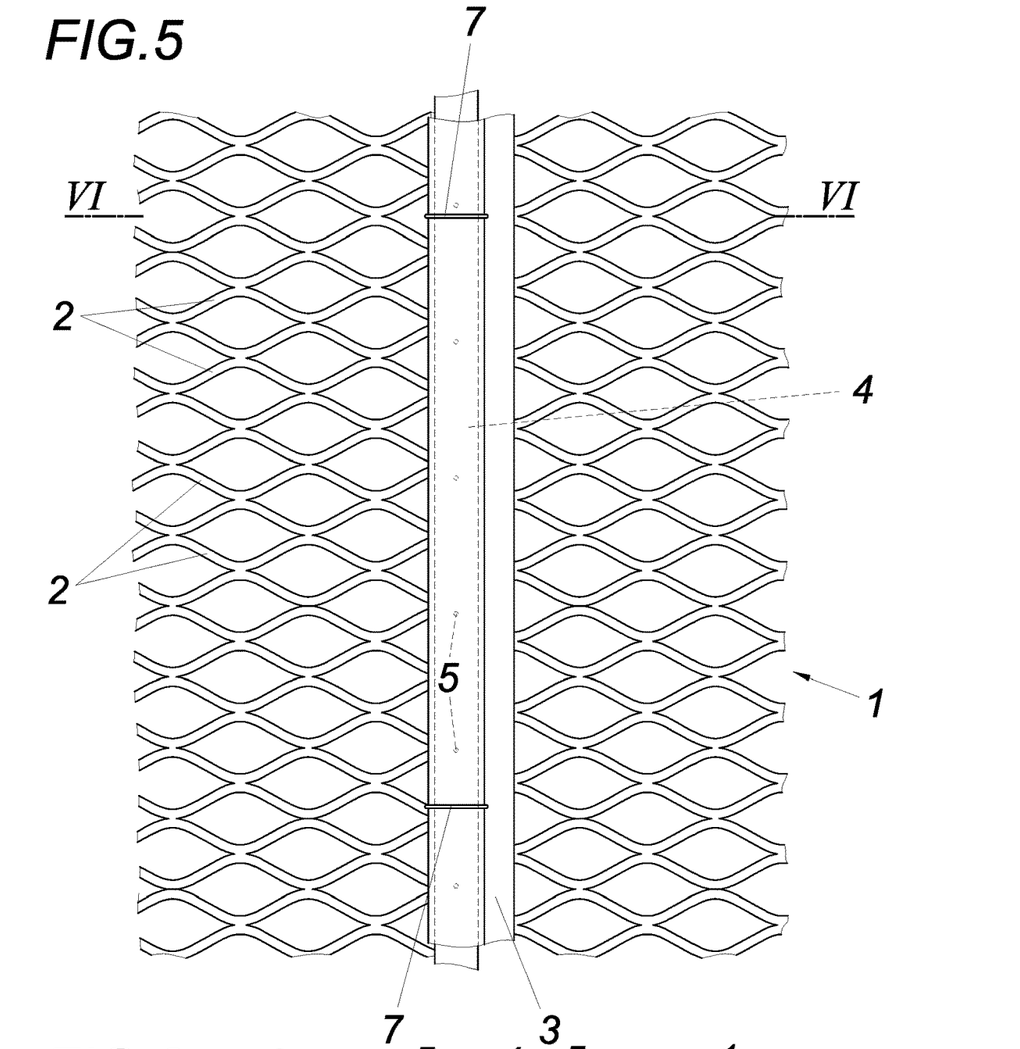
FIG. 5 shows a representation of a further embodiment of the device.
Figure 6:
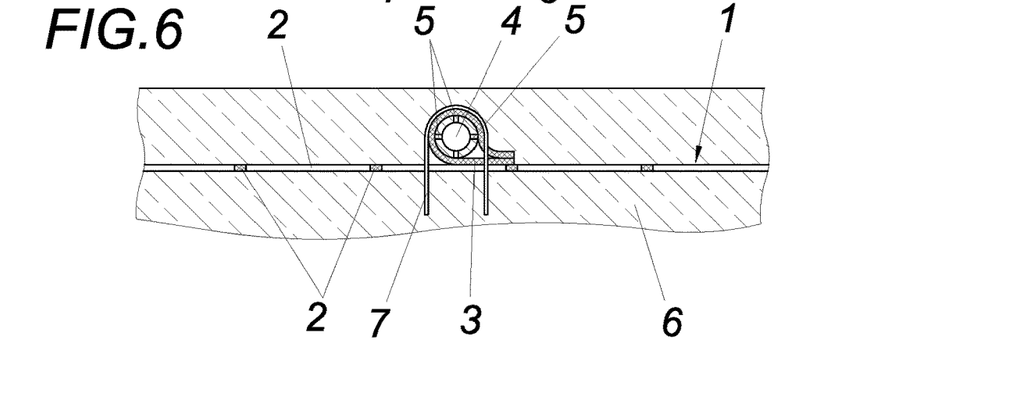
FIG. 6 shows a section according to line VI-VI of FIG. 5.

According to the embodiment example according to FIGS. 5 and 6, a nonwoven web 3 separate from the grid 1 is provided, which encloses the conduit strand 4 in a protective manner and is connected to the continuous grid 1, so that the water leaving the conduit strand 4 is transferred through the nonwoven web 3 to the grid 1. In this case, the separating cut rows of the nonwoven intended for the production of the grid 1 from a nonwoven can also run transversely to the conduit strand 4, as can be seen in FIG. 5, because in this case the stretching of the grid 1 transversely to the separating cut rows is not hindered by the subsequently applied nonwoven web 3. The course of the separating cut rows has a significant influence on the direction of the water distribution, which takes place in the direction of the arrays of the nonwoven strips 2 and is therefore preferably aligned transversely to the conduit strand 4 according to FIGS. 5 and 6, but parallel to the conduit strand 4 according to FIGS. 1 to 4.

Figure 7:
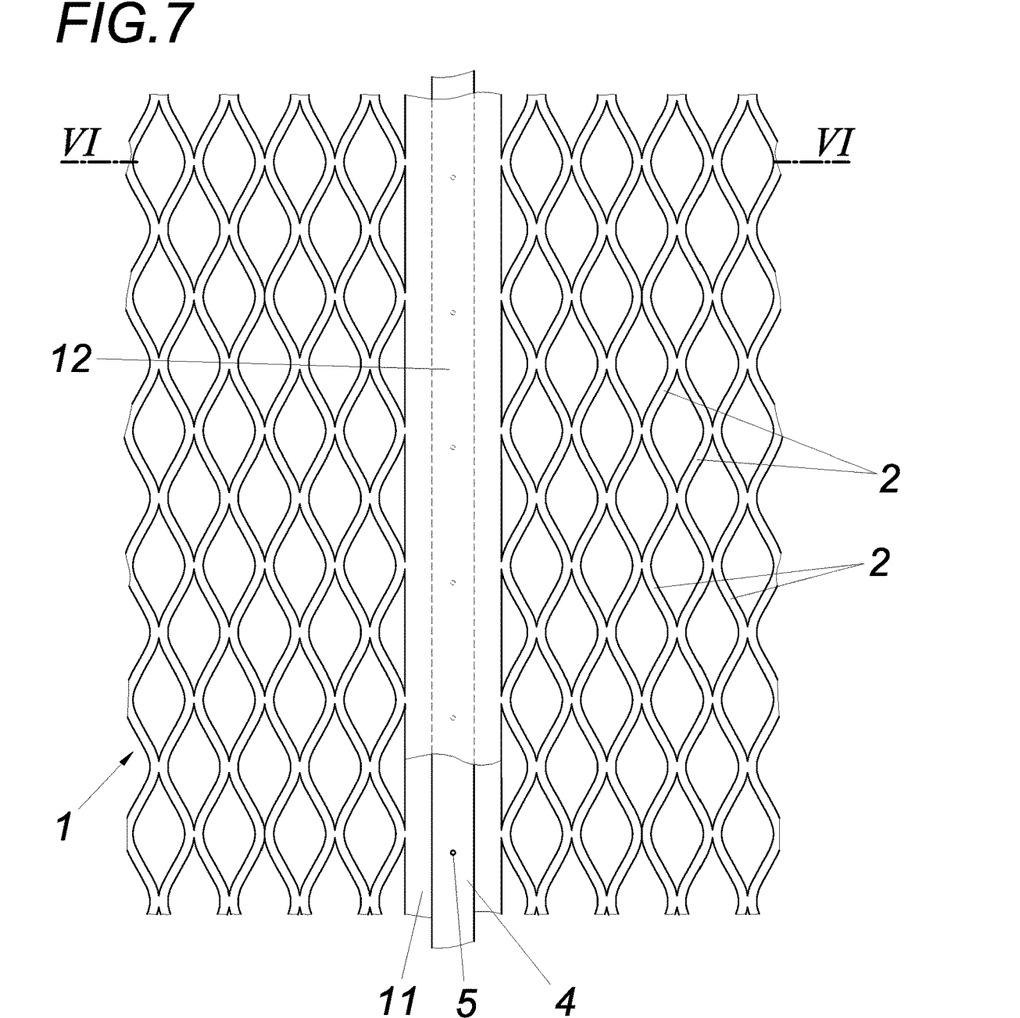
FIG. 7 shows a device according to the invention with a grid made of a two-layer nonwoven in a plan view.
Figure 8:
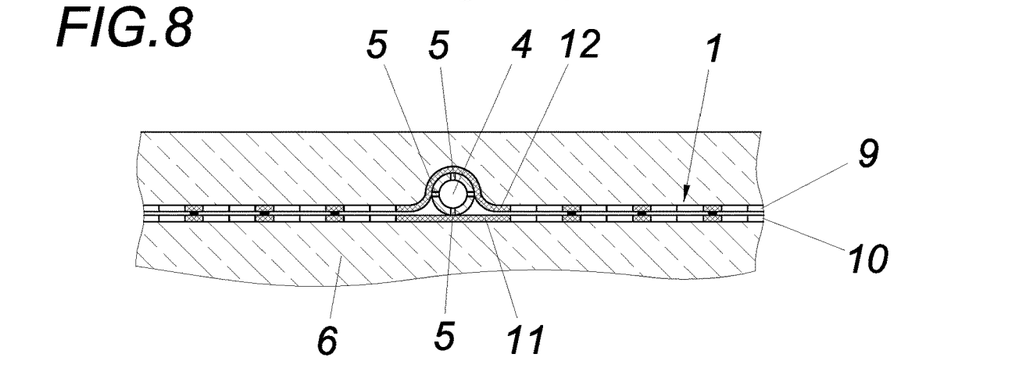
FIG. 8 shows the device according to FIG. 7 in a section according to line VIII-VIII of FIG. 7.

The device according to FIGS. 7 and 8 differs essentially from the device according to FIGS. 3 and 4 in that the nonwoven provided with parallel separating cut rows and stretched to the grid 1 is constructed from two layers 9, 10 needled together, which each form a web layer 11, 12. Between the two web layers 11 and 12 the conduit strand 4 can be taken up, as shown in FIG. 8. The two-layer nonwoven structure enables the storage of additives such as nutrients, soil improvement and fertilizing agents, microorganisms, trace elements, seeds, wood ash, mycorrhizae, moisture meters, superabsorbers and the like, as well as reinforcing inserts such as fibers, threads, wires, etc. Although in the embodiment example the two layers 9, 10 consist of a nonwoven, only one of these layers 9, 10 needs to be formed as a nonwoven. For example, one of the layers 9, 10 can consist of a film to prevent water from escaping on the side of the film.

Figure 9:
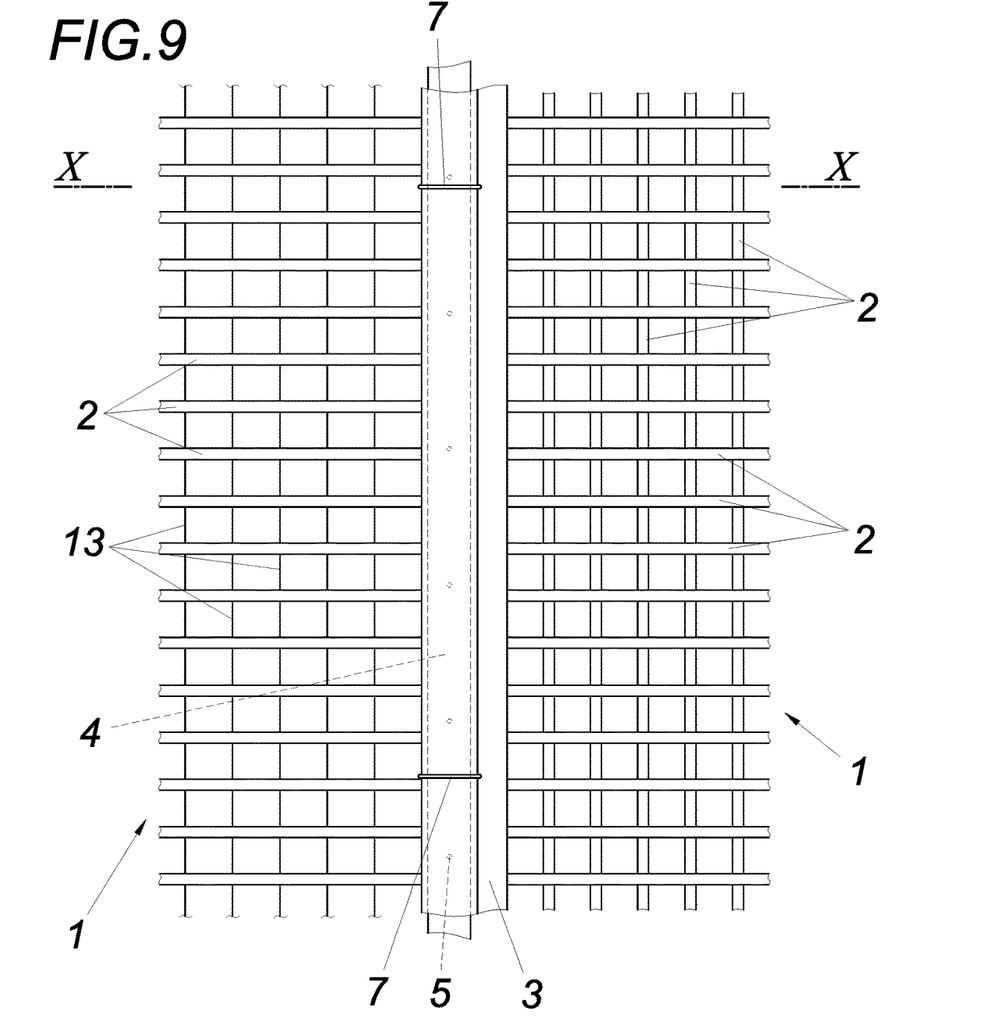
FIG. 9 shows an additional embodiment of a device according to the invention in a plan view.
Figure 10:
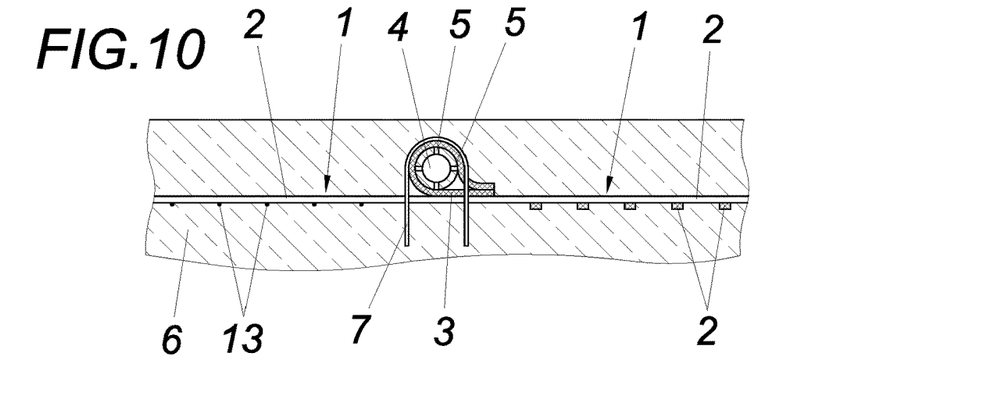
FIG. 10 shows a section according to the line X-X of FIG. 9.

It can be seen from the embodiment example given in FIGS. 9 and 10 that grid 1 of the device according to the invention can be constructed differently. This grid 1 can, for example, be composed of two arrays of nonwoven strips 2 crossing each other at right angles, which run parallel and perpendicular to the conduit strand 4 and are connected to each other at the junctions, as shown by grid 1 on the right side of the conduit strand 4. However, according to the left side, it is also possible to form only one array of grid strands as nonwoven strip 2. The other grid strands 13 may be made of a material meeting the requirements, e.g. woven fabric strips, tensile cords, wires, etc. The nonwoven web 3, which in such a case is usually not part of the grid 1, can enclose the conduit strand 4 according to the embodiment according to FIGS. 4 and 5.

Figure 11:
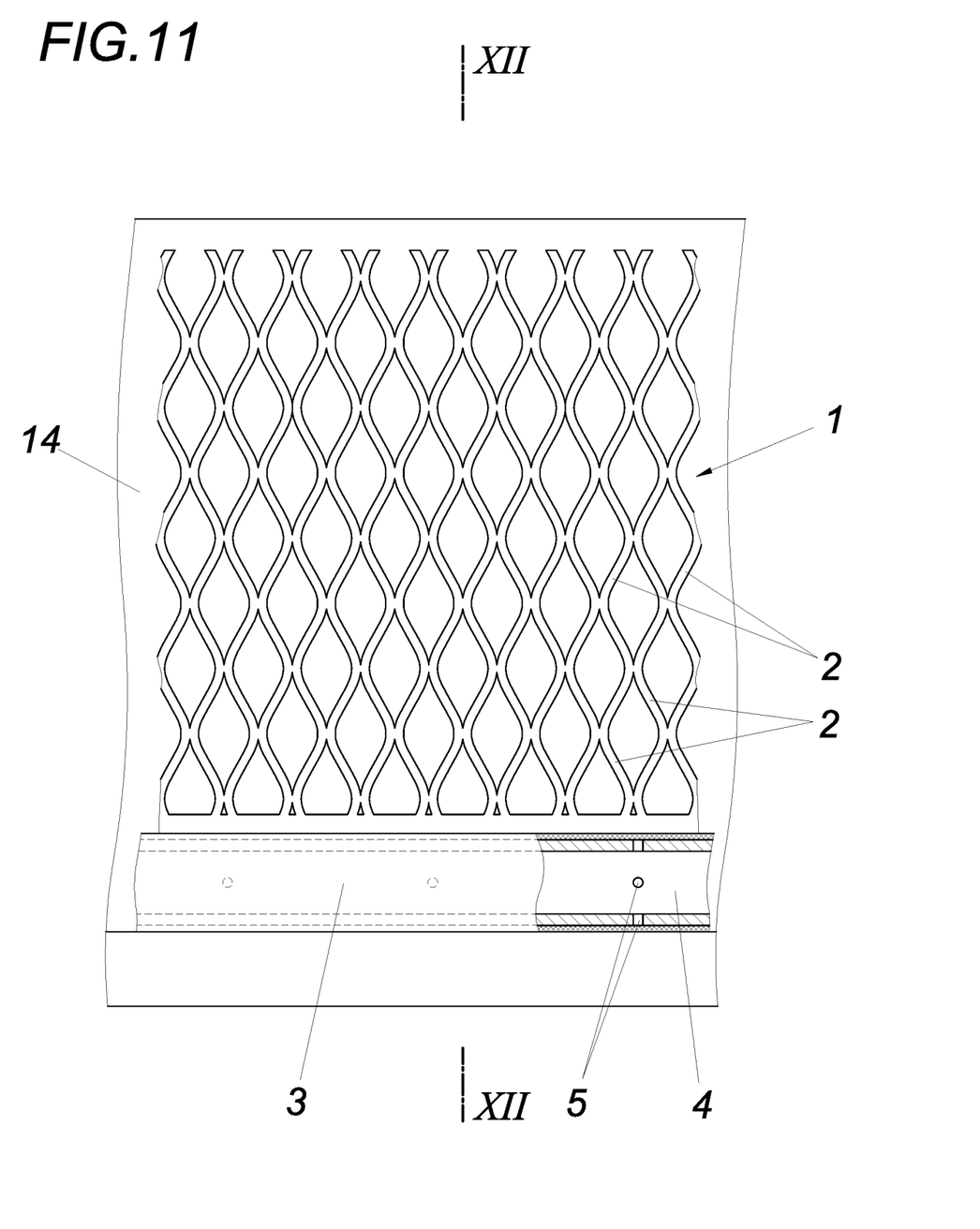
FIG. 11 shows a device according to the invention for drainage in a front view.
Figure 12:
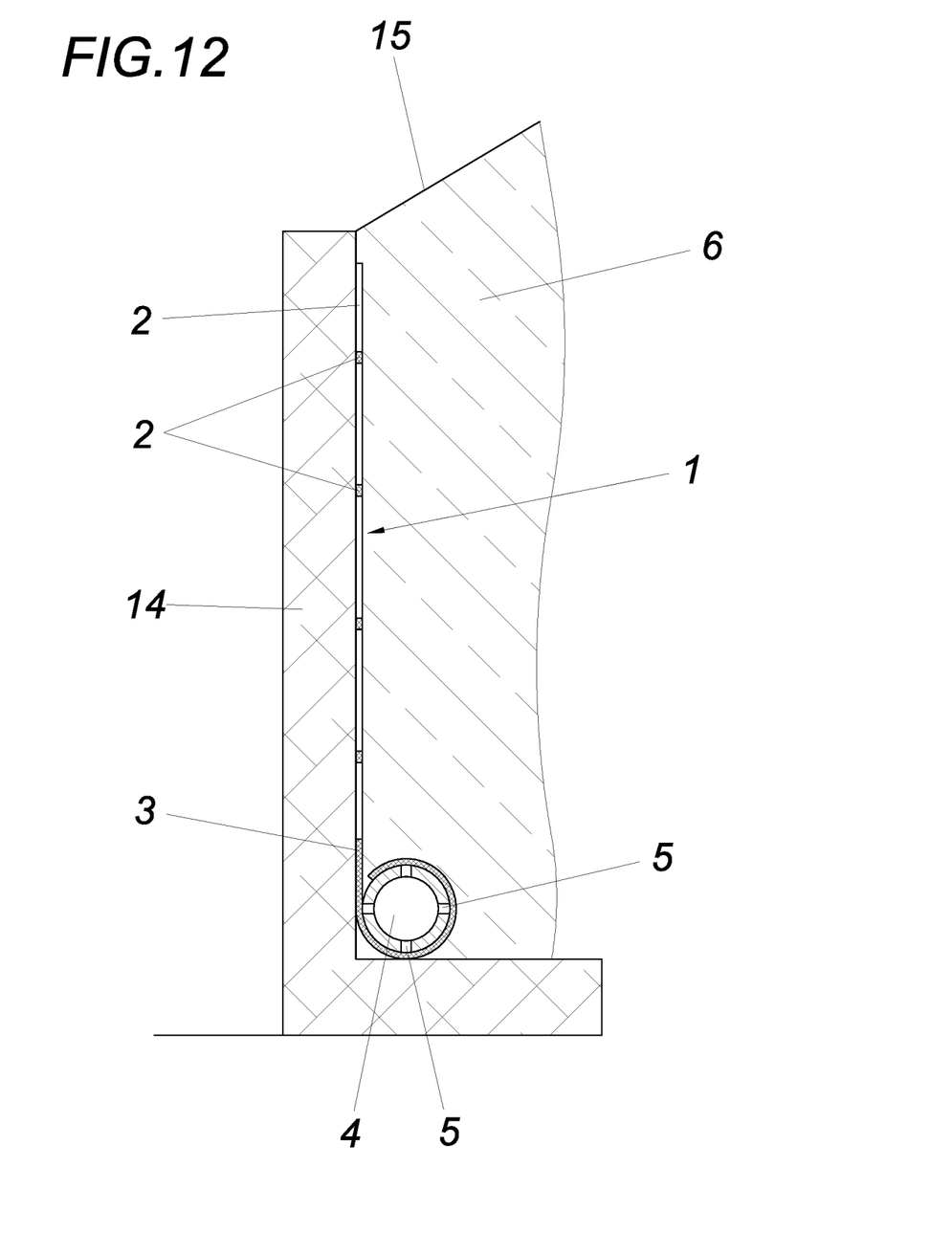
FIG. 12 shows the device according to FIG. 11 in a section according to the line XII-XII of FIG. 11.

Finally, FIGS. 11 and 12 illustrate the use of a device for drainage in accordance with the invention. The grid 1 from the nonwoven strips 2 is laid along a supporting wall 14 for an embankment 15 as shown in the embodiment example and is closed at the bottom by the nonwoven strip 3, which surrounds the conduit strand 4 with the passage openings 5, so that the excess water taken up by the grid 1 and collected in the nonwoven strip 3 and to be discharged can flow off through the conduit strand 4.

The invention claimed is:

1. A device for conducting water in a ground surface with a nonwoven layer which is introduced into the ground (6), the device comprising:
   at least one conduit strand (4) for conducting water which is provided with one or more passage openings (5);
   a nonwoven layer forming a grid (1) made of intersecting arrays of grid strands and further comprising a nonwoven web (3) extending along the at least one conduit strand (4); wherein the grid strands and the nonwoven web both comprise a capillary structure; and
   wherein at least one array of grid strands formed from nonwoven strips (2) laterally adjoins a longitudinal edge of the nonwoven web (3).

2. The device according to claim 1, characterized in that a portion of the nonwoven web (3) surrounds the conduit strand (4).

3. The device according to claim 1, characterized in that the conduit strand (4) is arranged between the nonwoven web (3) and a cover web (8) connected to the nonwoven web (3).

4. The device according to claim 1, characterized in that the nonwoven layer comprises an at least single-layer nonwoven which is provided with parallel rows of separating cuts arranged at a mutual spacing, wherein the separating cuts are offset in rows relative to one another and is drawn apart transversely to the rows of separating cuts relative to the grid (1).

5. The device according to claim 4, characterized in that the nonwoven pulled apart to form the grid (1) is connected to the adjacent nonwoven web (3).

6. The device according to claim 4, characterized in that the nonwoven layer forms the continuous nonwoven web (3) and is drawn apart on both sides of this nonwoven web (3) towards the grid (1) by means of the separating cut rows parallel to the nonwoven web (3).

7. The device according to claim 4, characterized in that the nonwoven is composed of a nonwoven layer (9) and at least one further layer (10) connected to the nonwoven layer (9).

8. The device according to claim 7, characterized in that the two layers (9, 10) of the nonwoven form web layers (11, 12) which receive the conduit strand (4) between them.

9. The device according to claim 7, characterized in that the two layers (9, 10) of the nonwoven receive additives and/or reinforcing inserts between them.

* * * * *